US012559430B2

(12) United States Patent
Ko et al.

(10) Patent No.: US 12,559,430 B2
(45) Date of Patent: Feb. 24, 2026

(54) DOPED TITANIUM NIOBATE AND BATTERY

(71) Applicant: INDUSTRIAL TECHNOLOGY RESEARCH INSTITUTE, Hsinchu (TW)

(72) Inventors: Kuan-Yu Ko, Hsinchu County (TW); Po-Yang Hung, Douliu (TW); Chi-Ju Cheng, Hsinchu County (TW); Shih-Chieh Liao, Taoyuan (TW); Yung-Ting Fan, Hsinchu (TW); Jin-Ming Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 852 days.

(21) Appl. No.: 16/674,861

(22) Filed: Nov. 5, 2019

(65) Prior Publication Data

US 2020/0140339 A1 May 7, 2020

Related U.S. Application Data

(60) Provisional application No. 62/756,154, filed on Nov. 6, 2018.

(30) Foreign Application Priority Data

Sep. 10, 2019 (TW) .................................. 108132545

(51) Int. Cl.
  *H01M 4/485* (2010.01)
  *C04B 35/495* (2006.01)
  (Continued)

(52) U.S. Cl.
  CPC .......... *C04B 35/495* (2013.01); *H01M 4/362* (2013.01); *H01M 4/364* (2013.01); *H01M 4/485* (2013.01);
  (Continued)

(58) Field of Classification Search
  CPC ...... H01M 4/136; H01M 4/485; H01M 4/505; H01M 4/1315; Y02E 60/10; C01G 33/00; C01G 33/006
  See application file for complete search history.

(56) References Cited

U.S. PATENT DOCUMENTS 7,771,688 B2 8/2010 Lee et al.
8,647,773 B2 2/2014 Goodenough et al.
(Continued)

FOREIGN PATENT DOCUMENTS

CN 102479950 A 5/2012
CN 103346308 A 10/2013
(Continued)

OTHER PUBLICATIONS

Lin et al., Defective Ti2Nb10O27.1: an advanced anode material for lithium-ion batteries, Scientific Reports | 5:17836 | DOI: 10.1038/srep17836 (Year: 2015).*
(Continued)

*Primary Examiner* — Ula C Ruddock
*Assistant Examiner* — Anna Korovina
(74) *Attorney, Agent, or Firm* — Birch, Stewart, Kolasch & Birch, LLP

(57) ABSTRACT

Doped titanium niobate is provided, which has a chemical structure of $Ti_{(1-x)}M1_xNb_{(2-y)}M2_yO_{(7-z)}Q_z$ or $Ti_{(2-x')}M1_{x'}Nb_{(10-y')}M2_{y'}O_{(29-z')}Q_{z'}$, wherein M1 is Li, Mg, or a combination thereof; M2 is Fe, Mn, V, Ni, Cr, or a combination thereof; Q is F, Cl, Br, I, S, or a combination thereof; $0 \leq x \leq 0.15$; $0 \leq y \leq 0.15$; $0.01 \leq z \leq 2$; $0 \leq x' \leq 0.3$; $0 \leq y' \leq 0.9$; and $0.01 \leq z' \leq 8$.

19 Claims, 3 Drawing Sheets

(51) Int. Cl.

| | |
|---|---|
| *H01M 4/02* | (2006.01) |
| *H01M 4/36* | (2006.01) |
| *H01M 10/052* | (2010.01) |
| *C04B 111/94* | (2006.01) |

(52) U.S. Cl.

CPC .... *C04B 2111/94* (2013.01); *H01M 2004/027* (2013.01); *H01M 10/052* (2013.01)

(56) References Cited

U.S. PATENT DOCUMENTS

| | | | | |
|---|---|---|---|---|
| 8,916,294 | B2 | 12/2014 | Kumar et al. | |
| 9,806,338 | B2 | 10/2017 | Dai et al. | |
| 2009/0074651 | A1 | 3/2009 | Lee et al. | |
| 2009/0253042 | A1 | 10/2009 | Sun et al. | |
| 2010/0086854 | A1* | 4/2010 | Kumar | H01M 4/505 |
| | | | | 429/231.95 |
| 2012/0028108 | A1* | 2/2012 | Inagaki | H01M 10/052 |
| | | | | 977/773 |
| 2012/0052401 | A1 | 3/2012 | Goodenough et al. | |
| 2014/0170497 | A1 | 6/2014 | Inaba et al. | |
| 2014/0295282 | A1* | 10/2014 | Harada | C01G 45/1278 |
| | | | | 429/231.1 |
| 2015/0056514 | A1 | 2/2015 | Dai et al. | |
| 2015/0086872 | A1* | 3/2015 | Ise | C01G 49/0018 |
| | | | | 427/122 |
| 2016/0028074 | A1* | 1/2016 | Sugiura | H01M 4/505 |
| | | | | 429/223 |
| 2017/0005332 | A1* | 1/2017 | Chen | H01M 4/625 |
| 2019/0181443 | A1* | 6/2019 | Ikeuchi | H01M 4/505 |

FOREIGN PATENT DOCUMENTS

| | | | | | |
|---|---|---|---|---|---|
| CN | 103458940 | A | 12/2013 | | |
| CN | 103828099 | A | 5/2014 | | |
| CN | 104282899 | A | 1/2015 | | |
| CN | 104466150 | A | 3/2015 | | |
| CN | 104979542 | A | 10/2015 | | |
| CN | 105958049 | A | 9/2016 | | |
| CN | 106920928 | A | 7/2017 | | |
| CN | 107230780 | A | 10/2017 | | |
| CN | 107845805 | A | 3/2018 | | |
| JP | 2006-172991 | A | 6/2006 | | |
| JP | 2014-209445 | A | 11/2014 | | |
| JP | 2017-152217 | A | 8/2017 | | |
| WO | WO-2018092359 | A1 * | 5/2018 | | C01B 11/24 |

OTHER PUBLICATIONS

Wang et al., Mutual Effects of Fluorine Dopant and Oxygen Vacancies on Structural and Luminescence Characteristics of F Doped SnO2 Nanoparticles, Materials Oct. 2017, 1398; doi.org/10.3390/ma10121398) (Year: 2017).*

Guo et al., A long-life lithium-ion battery with a highly porous TiNb2O7 anode for large-scale electrical energy storage, Energy Environ. Sci., Jul. 2014, 2220, DOI: 10.1039/c4ee00508b (Year: 2014).*

Powell, "Metal oxyhalides and halides for use as electrode materials in Li-ion batteries.", PhD diss., University of Tennessee, 2017, https://trace.tennessee.edu/utk_graddiss/4643/ (Year: 2017).*

Zhang et al., "Synthesis and electrochemical properties of monoclinic fluorine-doped lithium manganeseoxide (LixMnO2-yFy) for lithium secondary batteries", RSC Adv., May 2015, 90150; DOI: 10.1039/c5ra19751a (Year: 2015).*

Lu et al., "Atomic-scale investigation on lithium storage mechanism in TiNb2O7", Energy Environ. Sci., Apr. 2011, 2638; DOI: 10.1039/c0ee00808g (Year: 2011).*

Saritha et al., "Studies on electrochemical lithium insertion in isostructural titanium niobate and tantalate phases with shear ReO3 structure", Materials Research Bulletin 48 (2013) 2702-2706; http://dx.doi.org/10.1016/j.materresbull.2013.03.033 (Year: 2013).*

Yu et al., "Bulk Modification of Porous TiNb2O7 Microsphere to Achieve Superior Lithium-Storage Properties at Low Temperature", Small 2023, 2303087; DOI: 10.1002/smll.202303087 (Year: 2023).*

Takashima et al. , "Characterization of mixed titanium-niobium oxide Ti2Nb10O29 annealed in vacuum as anode material for lithium-ion battery", Journal of Power Sources 276 (2015) 113-119, http://dx.doi.org/10.1016/j.jpowsour.2014.11.109 (Year: 2015).*

Japanese Office Action for Japanese Application No. 2019-200560, dated Nov. 4, 2020, with English translation.

Chinese Office Action and Search Report for Chinese Application No. 201910956006.9 dated Feb. 8, 2022.

Aravindan et al., "Research Progress on Negative Electrodes for Practical Li-Ion Batteries: Beyond Carbonaceous Anodes", Adv. Energy Mater. 43 pgs., 2015.

Guo et al., "A long-life lithium-ion battery with a highly porous TiNb2O7 anode for large-scale electrical energy storage", Energy & Environmental Science, 7, pp. 2220-2226, 2014.

Han et al., "New Anode Framework for Rechargeable Lithium Batteries", Chemistry of Materials, 23, pp. 12027-2029, 2011.

Taiwanese Office Action and Search Report for Taiwanese Application No. 108132545, dated May 26, 2020.

* cited by examiner

DOPED TITANIUM NIOBATE AND BATTERY

CROSS REFERENCE TO RELATED APPLICATIONS

This application claims the benefit of U.S. Provisional Application No. 62/756,154 filed on Nov. 6, 2018, and claims priority from Taiwan Application Serial Number 108132545, filed on Sep. 10, 2019, the disclosure of which are hereby incorporated by reference herein in their entirety.

TECHNICAL FIELD

The technical field relates to a battery and a negative electrode composition of the battery.

BACKGROUND

Although the major material used in conventional carbon negative electrodes has good capacity (~350 mA/g), it still has issues about cycle lifetime, safety, fast charging, and the like. Lithium titanate ($Li_4Ti_5O_{12}$) is a fast chargeable negative electrode material with long lifetime and high safety, but its capacity is low (~165 mAh/g). Titanium niobate ($TiNb_2O_7$, TNO) is suitable for use as a fast chargeable negative electrode of the next generation due to its higher theoretical capacity (~380 mAh/g), its working potential of 1.6V (to avoid lithium dendrite growth), its good safety, its cycle lifetime, and its higher tapped density. A conventional lithium battery has high energy density but a lower charging rate (<5C, charging 50%). A lithium titanate battery has a fast charging rate (>5C, charging at least 80%) but low energy density. Because titanium niobate has a higher capacity and energy density than lithium titanate, it may greatly increase the energy density of a fast chargeable lithium battery. It can therefore be widely applied to improve the endurance and charging rate of electric vehicles; to enhance energy storage density of its energy storage system; and to reduce the charging time of consumer electronics. In addition, titanium niobate has excellent properties at low temperatures, allowing it to adapt to various harsh environments. However, titanium niobate has poor electrical conductivity. Titanium niobate requires further modification if it is to be applied in power lithium batteries.

SUMMARY

One embodiment of the disclosure provides doped titanium niobate, having a chemical structure of: $Ti_{(1-x)}M1_xNb_{(2-y)}M2_yO_{(7-z)}Q_z$ or $Ti_{(2-x')}M1_xNb_{(10-y')}M2_yO_{(29-z')}Q_{z'}$, wherein M1 is Li, Mg, or a combination thereof; M2 is Fe, Mn, V, Ni, Cr, or a combination thereof; Q is F, Cl, Br, I, S, or a combination thereof; $0 \le x \le 0.15$; $0 \le y \le 0.15$; $0.01 \le z \le 2$; $0 \le x' \le 0.3$; $0 \le y' \le 0.9$; and $0.01 \le z' \le 8$.

In one embodiment, $Ti_{(1-x)}M1_xNb_{(2-y)}M2_yO_{(7-z)}Q_z$ has a monoclinic lattice, and $Ti_{(2-x')}M1_xNb_{(10-y')}M2_yO_{(29-z')}Q_{z'}$ has a $ReO_3^-$ type crystal structure.

In one embodiment, the doped titanium niobate is a porous structure composed of a plurality of primary particles.

In one embodiment, the porous structure has a median particle size of 0.3 micrometers to 60 micrometers, the primary particles have a median particle size of 0.01 micrometers to 5 micrometers, and the porous structure has a pore size of 50 nanometers to 1 micrometer.

In one embodiment, the doped titanium niobate is a non-porous structure.

In one embodiment, the non-porous structure has a median particle size of 0.01 micrometers to 10 micrometers.

In one embodiment, the doped titanium niobate further mixes with lithium titanate to form a composite material, wherein the doped titanium niobate and the lithium titanate have a weight ratio of 90:10 to 10:90.

In one embodiment, surface of the lithium titanate is covered with carbon, oxide, or fluoride, wherein the carbon, oxide, or fluoride and the lithium titanate have a weight ratio of greater than 0 and less than or equal to 5%.

In one embodiment, surface of the composite material is covered with carbon, oxide, or fluoride, wherein the carbon, oxide, or fluoride and the composite material have a weight ratio of greater than 0 and less than or equal to 5%.

In one embodiment, the surface of the doped titanium niobate is covered with carbon, oxide, or fluoride, wherein the carbon, oxide, or fluoride and the doped titanium niobate have a weight ratio of greater than 0 and less than or equal to 5%.

One embodiment provides a battery, including: a negative electrode; a positive electrode; and an electrolyte disposed between the negative electrode and the positive electrode, wherein the negative electrode comprises doped titanium niobate, having a chemical structure of: $Ti_{(1-x)}M1_xNb_{(2-y)}M2_yO_{(7-z)}Q_z$ or $Ti_{(2-x')}M1_xNb_{(10-y')}M2_yO_{(29-z')}Q_{z'}$, wherein M1 is Li, Mg, or a combination thereof; M2 is Fe, Mn, V, Ni, Cr, or a combination thereof; Q is F, Cl, Br, I, S, or a combination thereof; $0 \le x \le 0.15$; $0 \le y \le 0.15$; $0.01 \le z \le 2$; $0 \le x' \le 0.3$; $0 \le y' \le 0.9$; and $0.01 \le z' \le 8$.

In one embodiment, $Ti_{(1-x)}M1_xNb_{(2-y)}M2_yO_{(7-z)}Q_z$ has a monoclinic lattice, and $Ti_{(2-x')}M1_xNb_{(10-y')}M2_yO_{(29-z')}Q_{z'}$ has a $ReO_3^-$ type crystal structure.

In one embodiment, the negative electrode further includes lithium titanate, the lithium titanate and the doped titanium niobate are mixed to form a composite material, and the doped titanium niobate and the lithium titanate have a weight ratio of 90:10 to 10:90.

In one embodiment, surface of the lithium titanate is covered with carbon, oxide, or fluoride, wherein the carbon, oxide, or fluoride and the lithium titanate have a weight ratio of greater than 0 and less than or equal to 5%.

In one embodiment, surface of the composite material is covered with carbon, oxide, or fluoride, wherein the carbon, oxide, or fluoride and the composite material have a weight ratio of greater than 0 and less than or equal to 5%.

In one embodiment, the surface of the doped titanium niobate is covered with carbon, oxide, or fluoride, wherein the carbon, oxide, or fluoride and the doped titanium niobate have a weight ratio of greater than 0 and less than or equal to 5%.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
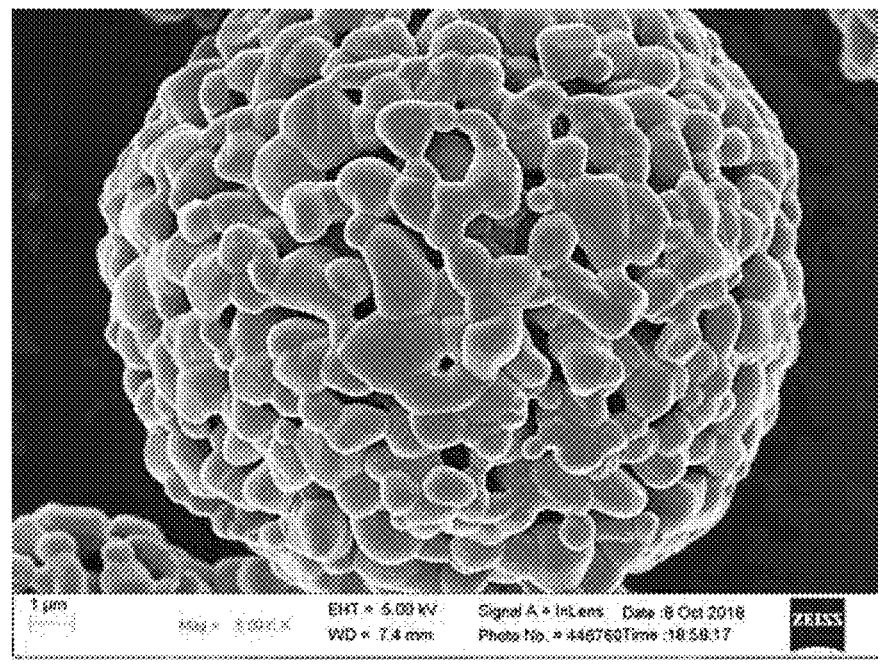
FIG. 1 shows a scanning electron microscope image of a porous structure composed of primary particles of doped titanium niobate material in Example 1 of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides doped titanium niobate, having a chemical structure of: $Ti_{(1-x)}M1_x$ $Nb_{(2-y)}M2_yO_{(7-z)}Q_z$ or $Ti_{(2-x')}M1_{x'}Nb_{(10-y')}M2_{y'}O_{(29-z')}Q_{z'}$, wherein M1 is Li, Mg, or a combination thereof; M2 is Fe, Mn, V, Ni, Cr, or a combination thereof; Q is F, Cl, Br, I, S, or a combination thereof; $0 \leq x \leq 0.15$; $0 \leq y \leq 0.15$; $0.01 \leq z \leq 2$; $0 \leq x' \leq 0.3$; $0 \leq y' \leq 0.9$; and $0.01 \leq z' \leq 8$. In one embodiment, $0 \leq x \leq 0.05$. In one embodiment, $0.05 \leq x \leq 0.15$. In one embodiment, $0 \leq y \leq 0.03$. In one embodiment, $0.03 \leq y \leq 0.1$. In one embodiment, $0.1 \leq y \leq 0.15$. In one embodiment, $0 \leq y' \leq 0.25$. In one embodiment, $0.25 \leq y' \leq 0.9$. Overly high x, y, x', or y' may form impure phase (inactive phase), thereby reducing capacity per gram and charge-discharge rate performance. In one embodiment, $0.01 \leq z \leq 0.25$. In one embodiment, $0.25 \leq z \leq 0.75$. In one embodiment, $0.75 \leq z \leq 0.1$. In one embodiment, $1 \leq z \leq 2$. In one embodiment, $0.01 \leq z' \leq 4$. In one embodiment, $4 \leq z' \leq 8$. If z or z' is too low, it may result in the doped titanium niobate has properties similar to those of the undoped titanium niobate. If z or z' is too high, it may form impure phase (inactive phase), thereby reducing capacity per gram and charge-discharge rate performance. Obviously, the titanium niobate main body of the embodiments is $TiNb_2O_7$ or $Ti_2Nb_{10}O_{29}$, in which Ti can be optionally doped with M1, Nb can be optionally doped with M2, and O must be doped with Q. The doped titanium niobate of different atomic ratios may have completely different lattice and corresponding properties, which should not be considered as being easily replaced.

In one embodiment, $Ti_{(1-x)}M1_xNb_{(2-y)}M2_yO_{(7-z)}Q_z$ has a monoclinic lattice, and $Ti_{(2-x')}M1_{x'}Nb_{(10-y')}M2_{y'}O_{(29-z')}Q_{z'}$ has a $ReO_3^-$ type crystal structure. The doped titanium niobate of other lattice or amorphous structure may be improper to serve as the negative electrode material of lithium battery.

In some embodiments, the doped titanium niobate is a porous structure composed of a plurality of primary particles. For example, the porous structure has a median particle size ($d_{50}$) of 0.3 micrometers to 60 micrometers, the primary particles have a median particle size ($d_{50}$) of 0.01 micrometers to 5 micrometers, and the porous structure has a pore size of 50 nanometers to 1 micrometer. If the particle size of the porous structure is either too large or too small, it may reduce the electrode plate density. If the size of the primary particles is too large, it may increase the conductive path of lithium ions and electrons, thereby increasing the conductive time and decreasing the charge-discharge rate performance. If the primary particles are too small, it may increase the specific surface area of the material, making the slurry difficult to mix and disperse, and therefore lowering the electrode plate density and uniformity. If the pore size of the porous structure is too large, it may reduce the electrode plate density. If the pore size of the porous structure is too small, it may cause an overly dense porous structure, making it difficult for the electrolyte liquid to penetrate into the porous structure and therefore reduce the electrochemical reaction area.

Alternatively, the doped titanium niobate is non-porous structure with a median particle size of 0.01 micrometers to 10 micrometers. An overly large particle size of the non-porous structure may lower the electrode plate density, increase the conductive path of lithium ions and electrons, and increase the conductive time to decrease the charge-discharge rate performance. An overly small particle size of the non-porous structure may increase the specific surface area of the material, making the slurry difficult to mix and disperse, and therefore lowering the electrode plate density and uniformity.

The morphology of the porous structure or the non-porous structure is mainly the result of differences in the processing. For example, niobate oxide, titanium oxide, optional M1 source, optional M2 source, and Q source can be added into a solvent containing dispersant, and completely mixed for 8 to 24 hours to obtain a uniformly dispersed slurry. The slurry is then pelletized by spray drying to obtain precursor powder. In one embodiment, the suitable dispersant can be polyvinyl alcohol or commercial available BYK190. In one embodiment, the suitable solvent can be de-ionized water. The precursor powder is sintered at 900° C. to 1200° C. for 8 hours to 15 hours to form a porous structure of Q doped titanium niobate (optionally doped with M1 and/or M2).

On the other hand, niobate oxide, titanium oxide, optional M1 source, optional M2 source, and Q source can be added into a solvent containing dispersant, then ball-milled and dispersed 8 to 24 hours to obtain precursor powder. The precursor powder is sintered at 900° C. to 1200° C. for 8 hours to 15 hours to obtain a non-porous structure of Q doped titanium niobate (optionally doped with M1 and/or M2).

In addition, niobate oxide, titanium oxide, optional M1 source, and optional M2 source can be added into a solvent containing dispersant, and completely mixed for 8 to 24 hours to obtain a uniformly dispersed slurry. The slurry is then pelletized by spray drying to obtain precursor powder. The precursor powder is sintered at 900° C. to 1200° C. for 8 hours to 15 hours to form titanium niobate (optionally doped with M1 and/or M2). Subsequently, the titanium niobate is uniformly mixed with Q source, and then sintered at 350° C. to 750° C. for 2 hours to 5 hours to obtain a porous structure of Q doped titanium niobate (optionally doped with M1 and/or M2).

On the other hand, niobate oxide, titanium oxide, optional M1 source, and optional M2 source can be added into a solvent containing dispersant, then ball-milled and dispersed 8 to 24 hours to obtain precursor powder. The precursor powder is sintered at 900° C. to 1200° C. for 8 hours to 15 hours to form titanium niobate (optionally doped with M1 and/or M2). Subsequently, the titanium niobate is uniformly mixed with Q source, and then sintered at 350° C. to 750° C. for 2 hours to 5 hours to obtain a non-porous structure of Q doped titanium niobate (optionally doped with M1 and/or M2).

In some embodiments, the surface of the doped titanium niobate can be further coated with carbon, oxide, or fluoride to inhibit gas generation reaction. For example, the oxide can be aluminum oxide, magnesium oxide, or zinc oxide, and the fluoride can be aluminum fluoride. In some embodiments, "carbon, oxide, or fluoride" and "doped titanium niobate" have a weight ratio of greater than 0 and less than or equal to 5%. If the ratio of carbon, oxide, or fluoride is too high, it may form an overly thick wrapping layer, thereby hindering insertion and extraction of the lithium ions.

Alternatively, the doped titanium niobate can be mixed with lithium titanate (doped or undoped) to form a composite material for improving charging-discharging rate performance of the negative electrode and lowering cost. In some embodiments, the doped titanium niobate and the lithium titanate have a weight ratio of 90:10 to 10:90. If the lithium titanate amount is too low, its effect will be similar to the effect without lithium titanate. If the lithium titanate amount is too high, it may overly reduce the capacity per gram of the composite material. For example, the undoped lithium titanate has a chemical structure of $Li_4Ti_5O_a$, and $8 \leq a \leq 12$.

In some embodiments, surface of lithium titanate can be further covered with carbon, oxide, or fluoride to inhibit gas generation reaction. For example, the oxide can be aluminum oxide, magnesium oxide, or zinc oxide, and the fluoride can be aluminum fluoride. In some embodiments, "carbon, oxide, or fluoride" and "lithium titanate" have a weight ratio of greater than 0 and less than or equal to 5%. An overly high ratio of carbon, oxide, or fluoride may form an overly thick wrapping layer, thereby hindering insertion and extraction of the lithium ions.

In some embodiments, the surface of the composite material is covered with carbon, oxide, or fluoride to inhibit gas generation reaction. For example, the oxide can be aluminum oxide, magnesium oxide, or zinc oxide, and the fluoride can be aluminum fluoride. In some embodiments, "carbon, oxide, or fluoride" and "the composite material" have a weight ratio of greater than 0 and less than or equal to 5%. An overly high ratio of carbon, oxide, or fluoride may form an overly thick wrapping layer, thereby hindering insertion and extraction of the lithium ions.

The method of wrapping carbon, oxide, or fluoride on the surface of the doped titanium niobate, the lithium titanate, or the composite material may be found in the Journal of Power Sources, Vol. 196, Issue 18, 2011, P. 7763-7766. In the embodiments of the composite material, the surface of the doped titanium niobate, the surface of the lithium titanate, or the surface of both can be covered with the carbon, oxide, or fluoride, and then mixed to form the composite material. On the other hand, the doped titanium niobate and lithium titanate can be mixed to form a composite material, and surface of the composite material can be then covered with carbon, oxide, or fluoride.

In one embodiment, the doped titanium niobate or the composite material can be used in the negative electrode of the battery. For example, the battery may include a negative electrode, a positive electrode, and an electrolyte disposed between the negative electrode and the positive electrode, in which the negative electrode includes the described doped titanium niobate or the composite material. In addition, the negative electrode may further include electrically conductive carbon black, binder, or other suitable composition. In some embodiments, the positive electrode may include lithium cobaltate, lithium nickelate, lithium manganate, ternary positive electrode material, lithium iron phosphate, lithium iron manganese phosphate, or a combination thereof. In some embodiments, the electrolyte can be classified as being in a liquid state, a gel state, and a solid state. The liquid state electrolyte is composed of lithium salt and solvent (or ionic liquid). Typical lithium salt can be $LiPF_6$, $LiAsF_6$, $LiClO_4$, $LiBF_4$, LiTFSI, $LiCF_3SO_3$, or the like. Typical solvent can be cyclic carbonate (e.g. ethylene carbonate, propylene carbonate), linear carbonate (e.g. dimethyl carbonate, diethyl carbonate, ethyl methyl carbonate), or ether compound (e.g. dimethyl ether, 1,3-dioxolane), or the like.

The solid state electrolyte can be classified as polymer, glass, ceramic, and the like. On the other hand, the negative electrode can be assembled with lithium metal positive electrode and typical electrolyte liquid to form a half-cell to measure the performance of the negative electrode containing the doped titanium niobate.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

Niobium oxide, titanium oxide, and fluorine source ($NH_4F$) of stoichiometric ratio were added to de-ionized water containing dispersant PVA BP-05, and then completely mixed for 18 hours to obtain a uniformly dispersed slurry. The uniformly dispersed slurry was pelletized by spray drying to obtain precursor powder. The precursor powder was put into a crucible and sintered at 1150° C. for 12 hours to obtain fluorine doped titanium niobate material $TiNb_2O_{6.75}F_{0.25}$. The fluorine doped titanium niobate material $TiNb_2O_{6.75}F_{0.25}$ had monoclinic lattice (confirmed by X-ray diffraction). The fluorine doped titanium niobate material was a porous structure composed of a plurality of primary particles, and its SEM image is shown in FIG. 1. The primary particles had a median particle size of 0.01 micrometers to 5 micrometers, the porous structure had a median particle size of 0.3 micrometers to 60 micrometers, and the porous structure had a pore size of 50 nanometers to 1 micrometer.

Figure 2:
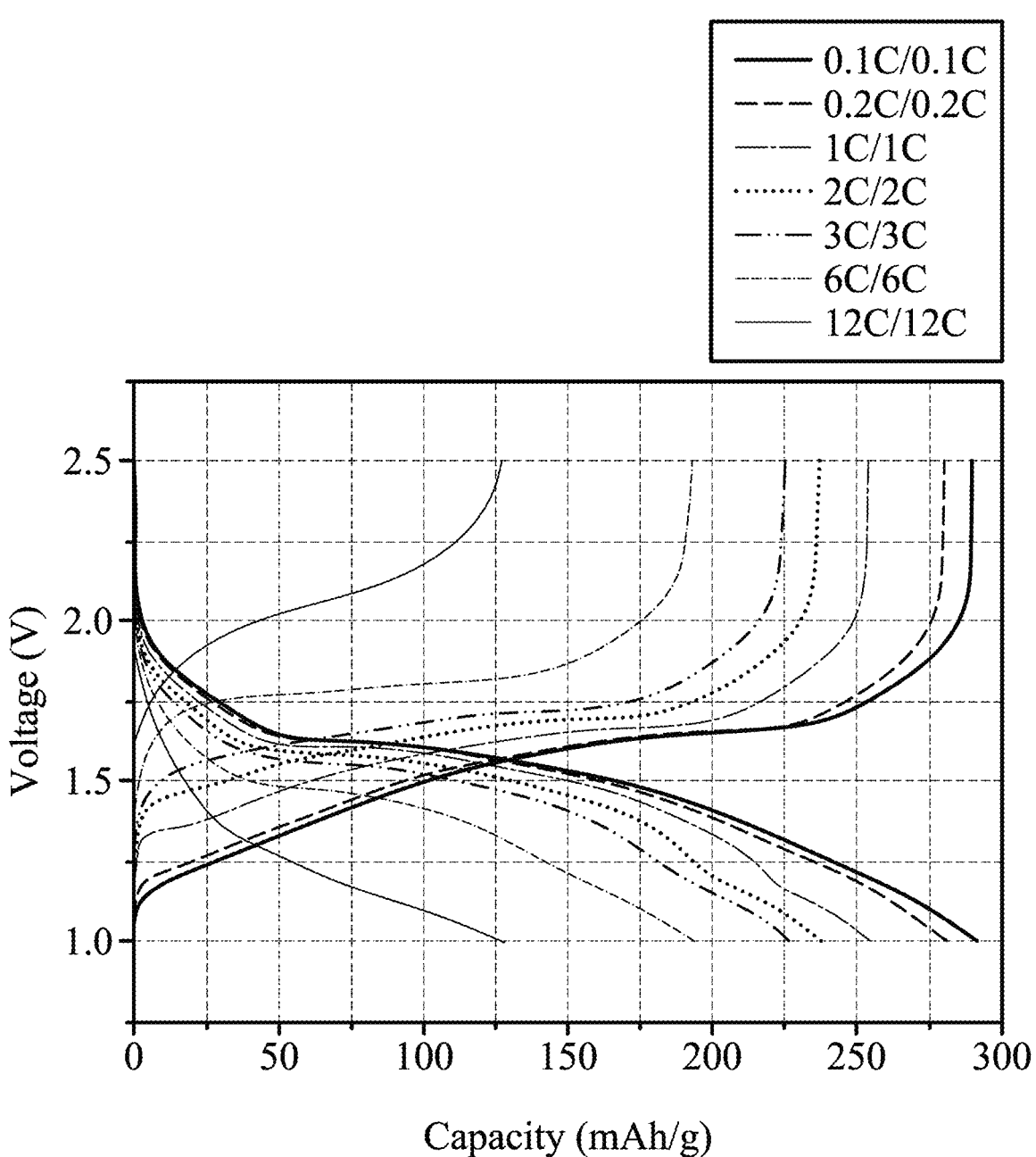
FIG. 2 shows curves of capacity versus voltage of the battery at different charge-discharge rates in Example 1 of the disclosure.

85 parts by weight of the fluorine doped titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were uniformly mixed to prepare a paste, and the paste was then coated on aluminum foil to form a coating layer with a thickness less than 150 micrometers. The coating layer was rolled by a rolling machine to have 65% original thickness, thereby forming a negative electrode plate. The negative electrode plate was cut to a circle shape with a diameter of 12 mm. The circular negative electrode plate, a lithium metal positive electrode plate, and electrolyte were assembled to form CR2032 half-cell to test its electrochemical properties. The electrolyte composition was 1M $LiPF_6$ solution, and the solvent was ethylene carbonate (EC) and dimethyl carbonate (DMC) (EC:DMC=1:2, v/v). FIG. 2 shows curves of capacity versus voltage of the battery at different charge-discharge rates. Table 1 shows the capacity of the battery at different charge-discharge rates.

Example 2

Niobium oxide and titanium oxide of stoichiometric ratio were added to de-ionized water containing dispersant PVA BP-05, and then completely mixed for 18 hours to obtain a uniformly dispersed slurry. The uniformly dispersed slurry was pelletized by spray drying to obtain precursor powder. The precursor powder was put into a crucible and sintered at 1150° C. for 12 hours to obtain titanium niobate. The titanium niobate and fluorine source ($NH_4F$) of stoichiometric ratio were uniformly mixed and then sintered at 450° C. for 5 hours to obtain fluorine doped titanium niobate material $TiNb_2O_{6.75}F0_{.25}$. The fluorine doped titanium niobate material $TiNb_2O_{6.75}F0_{.25}$ had monoclinic lattice (confirmed by XRD). The fluorine doped titanium niobate material was a porous structure composed of a plurality of primary particles. The primary particles had a median particle size of 0.01 micrometers to 5 micrometers, the porous structure had a median particle size of 0.3 micrometers to 60 micrometers, and the porous structure had a pore size of 50 nanometers to 1 micrometer.

Subsequently, a CR2032 half-cell was prepared in the same way as described in Example 1, and the difference in Example 2 was the negative electrode plate utilizing the fluorine doped titanium niobate material in Example 2 rather than the fluorine doped titanium niobate material in Example 1. Table 1 shows the capacity of the battery at different charge-discharge rates.

Example 3

Niobium oxide, titanium oxide, iron oxide, and fluorine source ($NH_4F$) of stoichiometric ratio were added to de-ionized water containing dispersant PVA BP-05, and then completely mixed for 18 hours to obtain a uniformly dispersed slurry. The uniformly dispersed slurry was pelletized by spray drying to obtain precursor powder. The precursor powder was put into a crucible and sintered at 1150° C. for 12 hours to obtain fluorine and iron doped titanium niobate material $TiNb_{1.9}Fe_{0.1}O_{6.25}F_{0.75}$. The fluorine and iron doped titanium niobate material $TiNb_{1.9}Fe_{0.1}O_{6.25}F_{0.75}$ had monoclinic lattice (confirmed by XRD). The fluorine and iron doped titanium niobate material was a porous structure composed of a plurality of primary particles. The primary particles had a median particle size of 0.01 micrometers to 5 micrometers, the porous structure had a median particle size of 0.3 micrometers to 60 micrometers, and the porous structure had a pore size of 50 nanometers to 1 micrometer.

Subsequently, a CR2032 half-cell was prepared in the same way as described in Example 1, and the difference in Example 3 was the negative electrode plate utilizing the fluorine and iron doped titanium niobate material in Example 3 rather than the fluorine doped titanium niobate material in Example 1. Table 1 shows the capacity of the battery at different charge-discharge rates.

Example 4

Niobium oxide, titanium oxide, and fluorine source ($NH_4F$) of stoichiometric ratio were added to ethanol, ball-milled for 24 hours, and then sieved to obtain precursor powder. The precursor powder was put into a crucible and sintered at 1000° C. for 18 hours to obtain fluorine doped titanium niobate material $TiNb_2O_6F$. The fluorine doped titanium niobate material $TiNb_2O_6F$ had monoclinic lattice (confirmed by XRD). The fluorine doped titanium niobate material was a non-porous structure with a median particle size of 0.01 micrometers to 10 micrometers.

Subsequently, a CR2032 half-cell was prepared in the same way as described in Example 1, and the difference in Example 4 was the negative electrode plate utilizing the fluorine doped titanium niobate material in Example 4 rather than the fluorine doped titanium niobate material in Example 1. Table 1 shows the capacity of the battery at different charge-discharge rates.

Example 5

Niobium oxide, titanium oxide, and fluorine source ($NH_4F$) of stoichiometric ratio were added to ethanol, ball-milled for 24 hours, and then sieved to obtain precursor powder. The precursor powder was put into a crucible and sintered at 1000° C. for 18 hours to obtain fluorine doped titanium niobate material $TiNb_2O_6F$. The fluorine doped titanium niobate material $TiNb_2O_6F$ had monoclinic lattice (confirmed by XRD). The fluorine doped titanium niobate material was a non-porous structure with a median particle size of 0.01 micrometers to 10 micrometers. 20 g of the sintered fluorine doped titanium niobate material and 0.6 g of glucose were added to 50 g of de-ionized water to be stirred 24 hours, and then baking dried and put into a crucible to be sintered at 700° C. under nitrogen for 6 hours, thereby forming a carbon film wrapping the non-porous structure of the fluorine doped titanium niobate material $TiNb_2O_6F$.

Subsequently, a CR2032 half-cell was prepared in the same way as described in Example 1, and the difference in Example 5 was the negative electrode plate utilizing the fluorine doped titanium niobate material covered with the carbon film in Example 5 rather than the fluorine doped titanium niobate material in Example 1. Table 1 shows the capacity of the battery at different charge-discharge rates. The above treatment (carbon film) may inhibit the gas generation reaction of the lithium battery.

Example 6

Niobium oxide, titanium oxide, and magnesium fluoride of stoichiometric ratio were added to ethanol, ball-milled for 24 hours, and then sieved to obtain precursor powder. The precursor powder was put into a crucible and sintered at 1150° C. for 12 hours to obtain fluorine and magnesium doped titanium niobate material $Ti_{0.95}Mg_{0.05}Nb_2O_{6.9}F_{0.1}$. The fluorine and magnesium doped titanium niobate material $Ti_{0.95}Mg_{0.05}Nb_2O_{6.9}F_{0.1}$ had monoclinic lattice (confirmed by XRD). The fluorine and magnesium doped titanium niobate material was a non-porous structure with a median particle size of 0.01 micrometers to 10 micrometers.

Subsequently, a CR2032 half-cell was prepared in the same way as described in Example 1, and the difference in Example 6 was the negative electrode plate utilizing the fluorine and magnesium doped titanium niobate material in Example 6 rather than the fluorine doped titanium niobate material in Example 1. Table 1 shows the capacity of the battery at different charge-discharge rates.

Example 7

Niobium oxide, titanium oxide, chromium oxide, and fluorine source ($NH_4F$) of stoichiometric ratio were added into de-ionized water containing dispersant PVA BP-05, ball-milled for 24 hours, and then sieved to obtain precursor powder. The precursor powder was put into a crucible and sintered at 1150° C. for 12 hours to obtain fluorine and chromium doped titanium niobate material $TiNb_{1.97}Cr_{0.03}O_{6.9}F_{0.1}$. The fluorine and chromium doped titanium niobate material $TiNb_{1.97}Cr_{0.03}O_{6.9}F_{0.1}$ had monoclinic lattice (confirmed by XRD). The fluorine and chromium doped titanium niobate material was a non-porous structure with a median particle size of 0.01 micrometers to 10 micrometers.

Subsequently, a CR2032 half-cell was prepared in the same way as described in Example 1, and the difference in Example 7 was the negative electrode plate utilizing the fluorine and chromium doped titanium niobate material in Example 7 rather than the fluorine doped titanium niobate material in Example 1. Table 1 shows the capacity of the battery at different charge-discharge rates.

Comparative Example 1

Niobium oxide and titanium oxide of stoichiometric ratio were added to de-ionized water containing dispersant PVA BP-05, and then completely mixed for 18 hours to obtain a uniformly dispersed slurry. The uniformly dispersed slurry was pelletized by spray drying to obtain precursor powder. The precursor powder was put into a crucible and sintered at 1150° C. for 12 hours to obtain titanium niobate material $TiNb_2O_7$. The titanium niobate material was a porous structure composed of a plurality of primary particles. The primary particles had a median particle size of 0.01 micrometers to 5 micrometers, the porous structure had a median particle size of 0.3 micrometers to 60 micrometers, and the porous structure had a pore size of 50 nanometers to 1 micrometer.

Figure 3:
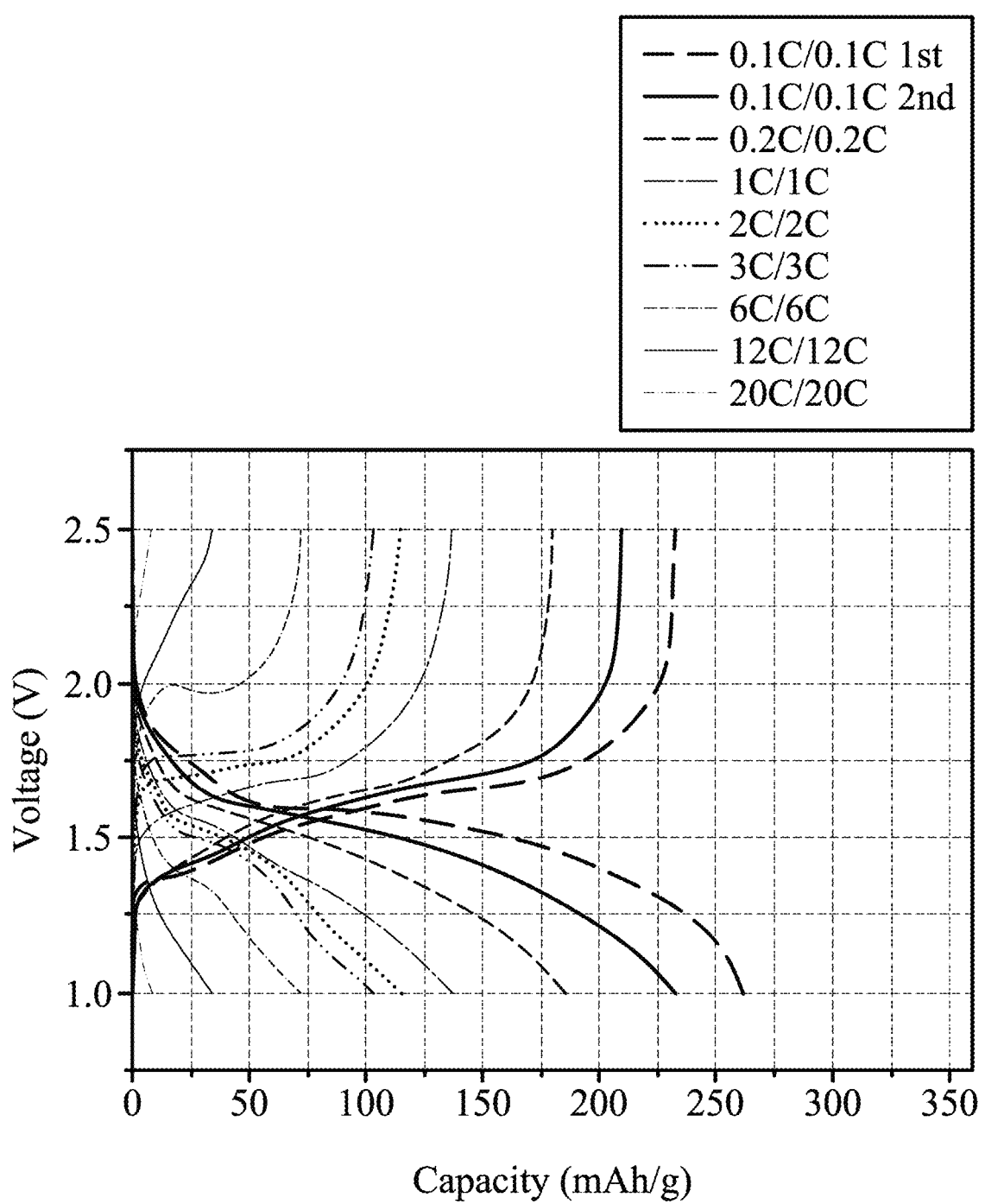
FIG. 3 shows curves of capacity versus voltage of the battery at different charge-discharge rates in Comparative Example 1 of the disclosure.

Subsequently, a CR2032 half-cell was prepared in the same way as described in Example 1, and the difference in Comparative Example 1 was the negative electrode plate utilizing the titanium niobate material in Comparative Example 1 rather than the fluorine doped titanium niobate material in Example 1. FIG. 3 shows curves of capacity versus voltage of the battery at different charge-discharge rates. Table 1 shows the capacity of the battery at different charge-discharge rates.

Comparative Example 2

Niobium oxide and titanium oxide of stoichiometric ratio were added to de-ionized water containing dispersant PVA BP-05, and then completely mixed for 18 hours to obtain a uniformly dispersed slurry. The uniformly dispersed slurry was pelletized by spray drying to obtain precursor powder. The precursor powder was put into a crucible and sintered at 1150° C. for 12 hours and then sintered at 450° C. for 5 hours to obtain titanium niobate material $TiNb_2O_7$. The titanium niobate material was a porous structure composed of a plurality of primary particles. The primary particles had a median particle size of 0.01 micrometers to 5 micrometers, the porous structure had a median particle size of 0.3 micrometers to 60 micrometers, and the porous structure had a pore size of 50 nanometers to 1 micrometer.

Subsequently, a CR2032 half-cell was prepared in the same way as described in Example 1, and the difference in Comparative Example 2 was the negative electrode plate utilizing the titanium niobate material in Comparative Example 2 rather than the fluorine doped titanium niobate material in Example 1. Table 1 shows the capacity of the battery at different charge-discharge rates.

Comparative Example 3

Niobium oxide, titanium oxide, and iron oxide of stoichiometric ratio were added to de-ionized water containing dispersant PVA BP-05, and then completely mixed for 18 hours to obtain a uniformly dispersed slurry. The uniformly dispersed slurry was pelletized by spray drying to obtain precursor powder. The precursor powder was put into a crucible and sintered at 1150° C. for 12 hours to obtain iron doped titanium niobate material $TiNb_{1.9}Fe_{0.1}O_7$. The iron doped titanium niobate material was a porous structure composed of a plurality of primary particles. The primary particles had a median particle size of 0.01 micrometers to 5 micrometers, the porous structure had a median particle size of 0.3 micrometers to 60 micrometers, and the porous structure had a pore size of 50 nanometers to 1 micrometer.

Subsequently, a CR2032 half-cell was prepared in the same way as described in Example 1, and the difference in Comparative Example 3 was the negative electrode plate utilizing the iron doped titanium niobate material in Comparative Example 3 rather than the fluorine doped titanium niobate material in Example 1. Table 1 shows the capacity of the battery at different charge-discharge rates.

Comparative Example 4

Niobium oxide and titanium oxide of stoichiometric ratio were added to ethanol, ball-milled for 24 hours, and then sieved to obtain precursor powder. The precursor powder was put into a crucible and sintered at 1150° C. for 12 hours to obtain titanium niobate material $TiNb_2O_7$. The titanium niobate material was a non-porous structure with a median particle size of 0.01 micrometers to 10 micrometers.

Subsequently, a CR2032 half-cell was prepared in the same way as described in Example 1, and the difference in Comparative Example 4 was the negative electrode plate utilizing the titanium niobate material in Comparative Example 4 rather than the fluorine doped titanium niobate material in Example 1. Table 1 shows the capacity of the battery at different charge-discharge rates.

TABLE 1

| | Capacity at 0.2 C (mAh/g) | Capacity at 1 C (mAh/g) | Capacity at 6 C (mAh/g) | Capacity at 12 C (mAh/g) |
|---|---|---|---|---|
| Example 1 | 280.95 | 254.79 | 193.47 | 127.47 |
| Example 2 | 227.85 | 190.18 | 138.0 | 97.0 |
| Example 3 | 226.30 | 194.19 | 145.58 | 113.30 |
| Example 4 | 255.35 | 227.28 | 179.46 | 141.95 |
| Example 5 | 256 | 215 | 165 | 130 |
| Example 6 | 256.33 | 214.88 | 155.94 | 106.55 |
| Example 7 | 242.13 | 213.11 | 148.372 | 100.30 |
| Comparative Example 1 | 206.24 | 158.06 | 80.17 | 43.02 |
| Comparative Example 2 | 235.33 | 191.18 | 128.49 | 77.31 |
| Comparative Example 3 | 214.07 | 177.12 | 116.28 | 46.40 |
| Comparative Example 4 | 219.06 | 183.85 | 127.21 | 85.88 |

Accordingly, the fluorine doped titanium niobate serving as the negative electrode of the battery could provide a higher capacity than the titanium niobate serving as the negative electrode of the battery.

Comparative Example 5

Niobium oxide and titanium oxide of stoichiometric ratio were added to ethanol, ball-milled for 24 hours, and then sieved to obtain precursor powder. The precursor powder was put into a crucible and sintered at 1100° C. for 16 hours to obtain titanium niobate material $Ti_2Nb_{10}O_{29}$. The titanium niobate material was a non-porous structure with a median particle size of 0.1 micrometers to 10 micrometers.

Subsequently, a CR2032 half-cell was prepared in the same way as described in Example 1, and the difference in Comparative Example 5 was the negative electrode plate utilizing the titanium niobate material in Comparative Example 5 rather than the fluorine doped titanium niobate material in Example 1. Table 2 shows the capacity of the battery at different charge-discharge rates.

Example 8

Niobium oxide, titanium oxide, and fluorine source $(NH_4F)$ of stoichiometric ratio were added to ethanol, ball-milled for 24 hours, and then sieved to obtain precursor powder. The precursor powder was put into a crucible and sintered at 1000° C. for 12 hours to obtain fluorine doped titanium niobate material $Ti_2Nb_{10}O_{25}F_4$. The fluorine doped titanium niobate material $Ti_2Nb_{10}O_{25}F_4$ had a $ReO_3^-$ type crystal structure (confirmed by XRD). The fluorine doped titanium niobate material was a non-porous structure with a median particle size of 0.1 micrometers to 10 micrometers.

Subsequently, a CR2032 half-cell was prepared in the same way as described in Example 1, and the difference in Example 8 was the negative electrode plate utilizing the fluorine doped titanium niobate material in Example 8 rather than the fluorine doped titanium niobate material in Example 1. Table 2 shows the capacity of the battery at different charge-discharge rates.

Example 9

Chromium oxide, niobium oxide, titanium oxide, and fluorine source $(NH_4F)$ of stoichiometric ratio were added to acetic acid, ball-milled for 24 hours, and then sieved to obtain precursor powder. The precursor powder was put into a crucible and sintered at 1200° C. for 10 hours to obtain fluorine and chromium doped titanium niobate material $Ti_2Nb_{9.75}Cr_{0.25}O_{25}F_4$. The fluorine and chromium doped titanium niobate material $Ti_2Nb_{9.75}Cr_{0.25}O_{25}F_4$ had a $ReO_3^-$ type crystal structure (confirmed by XRD). The fluorine and chromium doped titanium niobate material was a non-porous structure with a median particle size of 0.1 micrometers to 10 micrometers.

Subsequently, a CR2032 half-cell was prepared in the same way as described in Example 1, and the difference in Example 9 was the negative electrode plate utilizing the fluorine and chromium doped titanium niobate material in Example 9 rather than the fluorine doped titanium niobate material in Example 1. Table 2 shows the capacity of the battery at different charge-discharge rates.

Example 10

Iron oxide, niobium oxide, titanium oxide, and fluorine source $(NH_4F)$ of stoichiometric ratio were added to acetic acid, ball-milled for 24 hours, and then sieved to obtain precursor powder. The precursor powder was put into a crucible and sintered at 1200° C. for 10 hours to obtain fluorine and iron doped titanium niobate material $Ti_2Nb_{9.75}Fe_{0.25}O_{25}F_4$. The fluorine and iron doped titanium niobate material $Ti_2Nb_{9.75}Fe_{0.25}O_{25}F_4$ had a $ReO_3^-$ type crystal structure (confirmed by XRD). The fluorine and chromium doped titanium niobate material was a non-porous structure with a median particle size of 0.1 micrometers to 10 micrometers.

Subsequently, a CR2032 half-cell was prepared in the same way as described in Example 1, and the difference in Example 10 was the negative electrode plate utilizing the fluorine and iron doped titanium niobate material in Example 10 rather than the fluorine doped titanium niobate material in Example 1. Table 2 shows the capacity of the battery at different charge-discharge rates.

TABLE 2

| | Capacity at 0.2 C (mAh/g) | Capacity at 1 C (mAh/g) | Capacity at 6 C (mAh/g) | Capacity at 12 C (mAh/g) |
|---|---|---|---|---|
| Comparative Example 5 | 225.08 | 185.63 | 115.64 | 52.47 |
| Example 8 | 245.61 | 198.59 | 133.67 | 77.25 |
| Example 9 | 244.73 | 206.9 | 153.69 | 105.7 |
| Example 10 | 253.64 | 202.79 | 142.84 | 106.08 |

Accordingly, the fluorine doped titanium niobate serving as the negative electrode of the battery could provide a higher capacity than the titanium niobate serving as the negative electrode of the battery.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. Doped titanium niobate, having a chemical structure of:
$Ti_{(1-x)}M1_xNb_{(2-y)}M2_yO_{(7-z)}Q_z$ or $Ti_{(2-x')}M1_{x'}Nb_{(10-y')}M2_{y'}O_{(29-z')}Q_{z'}$,
wherein M1 is Li, Mg, or a combination thereof;
M2 is Fe, Mn, V, Ni, Cr, or a combination thereof;
Q is F, Cl, Br, I, S, or a combination thereof;
$0 \leq x \leq 0.15$;
$0 \leq y \leq 0.15$;
$0.01 \leq z \leq 2$;
$0 \leq x' \leq 0.3$;
$0 \leq y' \leq 0.9$; and
$0.01 \leq z' \leq 8$,
wherein $Ti_{(1-x)}M1_xNb_{(2-y)}M2_yO_{(7-z)}Q_z$ has a monoclinic lattice.

2. The doped titanium niobate as claimed in claim 1, wherein $Ti_{(2-x')}M1_{x'}Nb_{(10-y')}M2_{y'}O_{(29-z')}Q_{z'}$ has a $ReO_3$ type crystal structure.

3. The doped titanium niobate as claimed in claim 1, being a porous structure composed of a plurality of primary particles.

4. The doped titanium niobate as claimed in claim 3, wherein the porous structure has a median particle size of 0.3 micrometers to 60 micrometers, the primary particles have a median particle size of 0.01 micrometers to 5 micrometers, and the porous structure has a pore size of 50 nanometers to 1 micrometer.

5. The doped titanium niobate as claimed in claim 1, being a non-porous structure.

6. The doped titanium niobate as claimed in claim 5, wherein the non-porous structure has a median particle size of 0.01 micrometers to 10 micrometers.

7. The doped titanium niobate as claimed in claim 1, further mixing with lithium titanate to form a composite material, wherein the doped titanium niobate and the lithium titanate have a weight ratio of 90:10 to 10:90.

8. The doped titanium niobate as claimed in claim 7, wherein surface of the lithium titanate is covered with carbon, oxide, or fluoride, wherein the carbon, oxide, or fluoride and the lithium titanate have a weight ratio of greater than 0 and less than or equal to 5%.

9. The doped titanium niobate as claimed in claim 7, wherein the surface of the composite material is covered with carbon, oxide, or fluoride, wherein the carbon, oxide, or fluoride and the composite material have a weight ratio of greater than 0 and less than or equal to 5%.

10. The doped titanium niobate as claimed in claim 1, wherein the surface of the doped titanium niobate is covered with carbon, oxide, or fluoride, wherein the carbon, oxide, or fluoride and the doped titanium niobate have a weight ratio of greater than 0 and less than or equal to 5%.

11. A battery, comprising:

a negative electrode;

a positive electrode; and an electrolyte disposed between the negative electrode and the positive electrode, wherein the negative electrode comprises doped titanium niobate, having a chemical structure of:

$$Ti_{(1-x)}M1_xNb_{(2-y)}M2_yO_{(7-z)}Q_z \quad \text{or} \quad Ti_{(2-x')}M1_xNb_{(10-y')}M2_yO_{(29-z')}Q_{z'},$$

wherein M1 is Li, Mg, or a combination thereof;

M2 is Fe, Mn, V, Ni, Cr, or a combination thereof;

Q is F, Cl, Br, I, S, or a combination thereof;

$0 \leq x \leq 0.15$;

$0 \leq y \leq 0.15$;

$0.01 \leq z \leq 2$;

$0 \leq x' \leq 0.3$;

$0 \leq y' \leq 0.9$; and $0.01 \leq z' \leq 8$, wherein $Ti_{(1-x)}M1_xNb_{(2-y)}M2_yO_{(7-z)}Q_z$ has a monoclinic lattice.

12. The battery as claimed in claim 11, wherein $Ti_{(2-x')}M1_xNb_{(10-y')}M2_yO_{(29-z')}Q_{z'}$ has a ReO$_3$ type crystal structure.

13. The battery as claimed in claim 11, wherein the negative electrode further comprises lithium titanate, the lithium titanate and the doped titanium niobate are mixed to form a composite material, and the doped titanium niobate and the lithium titanate have a weight ratio of 90:10 to 10:90.

14. The battery as claimed in claim 13, wherein the surface of the lithium titanate is covered with carbon, oxide, or fluoride, wherein the carbon, oxide, or fluoride and the lithium titanate have a weight ratio of greater than 0 and less than or equal to 5%.

15. The battery as claimed in claim 13, wherein the surface of the composite material is covered with carbon, oxide, or fluoride, wherein the carbon, oxide, or fluoride and the composite material have a weight ratio of greater than 0 and less than or equal to 5%.

16. The battery as claimed in claim 11, wherein the surface of the doped titanium niobate is covered with carbon, oxide, or fluoride, wherein the carbon, oxide, or fluoride and the doped titanium niobate have a weight ratio of greater than 0 and less than or equal to 5%.

17. The doped titanium niobate as claimed in claim 1, wherein $0 < x \leq 0.15$.

18. The battery as claimed in claim 11, wherein $0 < x \leq 0.15$.

19. Doped titanium niobate, consisting of a compound having a chemical structure of:

$$Ti_{(1-x)}M1_xNb_{(2-y)}M2_yO_{(7-z)}Q_z \quad \text{or} \quad Ti_{(2-x')}M1_xNb_{(10-y')}M2_yO_{(29-z')}Q_{z'},$$

wherein M1 is Li, Mg, or a combination thereof;

M2 is Fe, Mn, V, Ni, Cr, or a combination thereof;

Q is F, Cl, Br, I, S, or a combination thereof;

$0 \leq x \leq 0.15$;

$0 \leq y \leq 0.15$;

$0.01 \leq z \leq 2$;

$0 \leq x' \leq 0.3$;

$0 \leq y' \leq 0.9$; and $0.01 \leq z' \leq 8$, wherein $Ti_{(1-x)}M1_xNb_{(2-y)}M2_yO_{(7-z)}Q_z$ has a monoclinic lattice.

* * * * *